United States Patent
Eidson et al.

(10) Patent No.: US 6,622,244 B1
(45) Date of Patent: Sep. 16, 2003

(54) BOOTING FROM A REPROGRAMMABLE MEMORY ON AN UNCONFIGURED BUS BY MODIFYING BOOT DEVICE ADDRESS

(75) Inventors: Mark E. Eidson, Tempe, AZ (US); Bruce L. Fleming, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/372,004

(22) Filed: Aug. 11, 1999

(51) Int. Cl.[7] ................................................ G06F 9/24
(52) U.S. Cl. ................................ 713/2; 710/3; 710/313
(58) Field of Search ........................ 713/2, 100; 710/3, 710/313

(56) References Cited

U.S. PATENT DOCUMENTS

| | | | | |
|---|---|---|---|---|
| 4,729,091 A | * | 3/1988 | Freeman et al. ............ 711/147 |
| 5,410,707 A | * | 4/1995 | Bell .............................. 713/2 |
| 5,835,760 A | * | 11/1998 | Harmer ......................... 713/2 |
| 5,987,536 A | * | 11/1999 | Johnson et al. ............... 710/36 |
| 5,987,551 A | * | 11/1999 | Klein .......................... 710/315 |
| 5,987,581 A | * | 11/1999 | Nale ............................ 711/202 |
| 6,003,103 A | * | 12/1999 | Klein .......................... 710/306 |
| 6,473,853 B1 | * | 10/2002 | Spiegel et al. ................. 713/1 |

FOREIGN PATENT DOCUMENTS

JP      2000259404 A   *   9/2000   ............. G06F/9/06

OTHER PUBLICATIONS

IBM Technical Disclosure Bulletin, "Means for Generating a Pass A20 Signal from a Single Register", vol. 35, No. 7, pp. 324–324, Dec. 1992.*

"Flash Memory PCI Add–In Card for Embedded Systems," AP–758 Application Note, Intel Corporation, Sep. 1997 pp. 1–13.

* cited by examiner

Primary Examiner—Thomas Lee
Assistant Examiner—Albert Wang
(74) Attorney, Agent, or Firm—Trop, Pruner & Hu, P.C.

(57) ABSTRACT

Boot up instructions may be stored on a memory coupled to the peripheral component interconnect (PCI) bus. These instructions may be accessed, despite the fact that peripheral component interconnect devices are normally not active during the boot up sequence. As a result, both the basic input/output system and other information may be stored on a reprogrammable memory coupled to the PCI bus. In some embodiments, this may reduce costs by avoiding the need for two semiconductor memories, one on the PCI bus and the other on a legacy bus.

18 Claims, 2 Drawing Sheets

BOOTING FROM A REPROGRAMMABLE MEMORY ON AN UNCONFIGURED BUS BY MODIFYING BOOT DEVICE ADDRESS

BACKGROUND

This invention relates generally to booting processor-based systems.

Many systems may be designed to startup, operate and store data using a non-volatile storage media. There are many types of non-volatile storage media including disk and tape drives. Silicon-based, battery backed volatile memory systems and non-volatile memory systems are also available. Some computing applications do not require the vast amounts of storage space available through disk and tape drives. In some cases it may be impractical to use these media because of environmental limitations. Battery backed semiconductor memory systems may provide suitable storage while the system is not operating, but reliability may be sacrificed because of limited battery lifetimes. For some systems, non-volatile semiconductor memory can provide significant storage at an attractive cost.

One type of memory which may be useful for replacing disk and tape drives is FLASH memory. FLASH memory is re-programmable, relatively fast and reasonably economical. The FLASH memory interface which interfaces a processor-based system to the FLASH memory may be located at three possible locations. It may be located on a legacy or Industry Standard Architecture (ISA) bus, on a Peripheral Components Interconnect (PCI) bus, or on the host bus. Typically, the host bus cannot be heavily loaded due to speed considerations. Thus, it may be impractical to add another host-to-FLASH device to the host bus.

Placing the FLASH memory on the ISA bus requires dedicated logic to decode addresses and to provide buffers and data steering. The ISA solution is relatively slow and may limit the total amount of FLASH memory that is available.

The PCI bus presents an easy to implement interface that can use current chipset technologies from the host processor bus. The PCI bus has good performance, industry standard protocols and provisions for system boot control.

However, placing the memory on the PCI bus creates a problem during boot up. Since generally the PCI devices are not configured until after the boot up sequence, the Basic Input/Output System (BIOS) is normally stored on a second semiconductor read only memory, on the legacy or ISA bus, which is accessible during the boot sequence. Additional cost is incurred by using two semiconductor memories, one on the PCI bus and one on the ISA bus.

Thus, there is a continuing need for a way to enable re-programmable non-volatile semiconductor memory to be located on the PCI bus without using a second memory on a different bus to store the basic input/output system.

SUMMARY

In accordance with one aspect, a method of implementing a processor-based system includes storing system boot instructions on a programmable, non-volatile memory coupled to a bus that is configured after the boot sequence. The instructions stored in the non-volatile memory are accessed in the process of booting the processor-based system.

Other aspects are set forth in the accompanying detailed description and claims.

DETAILED DESCRIPTION

Figure 1:
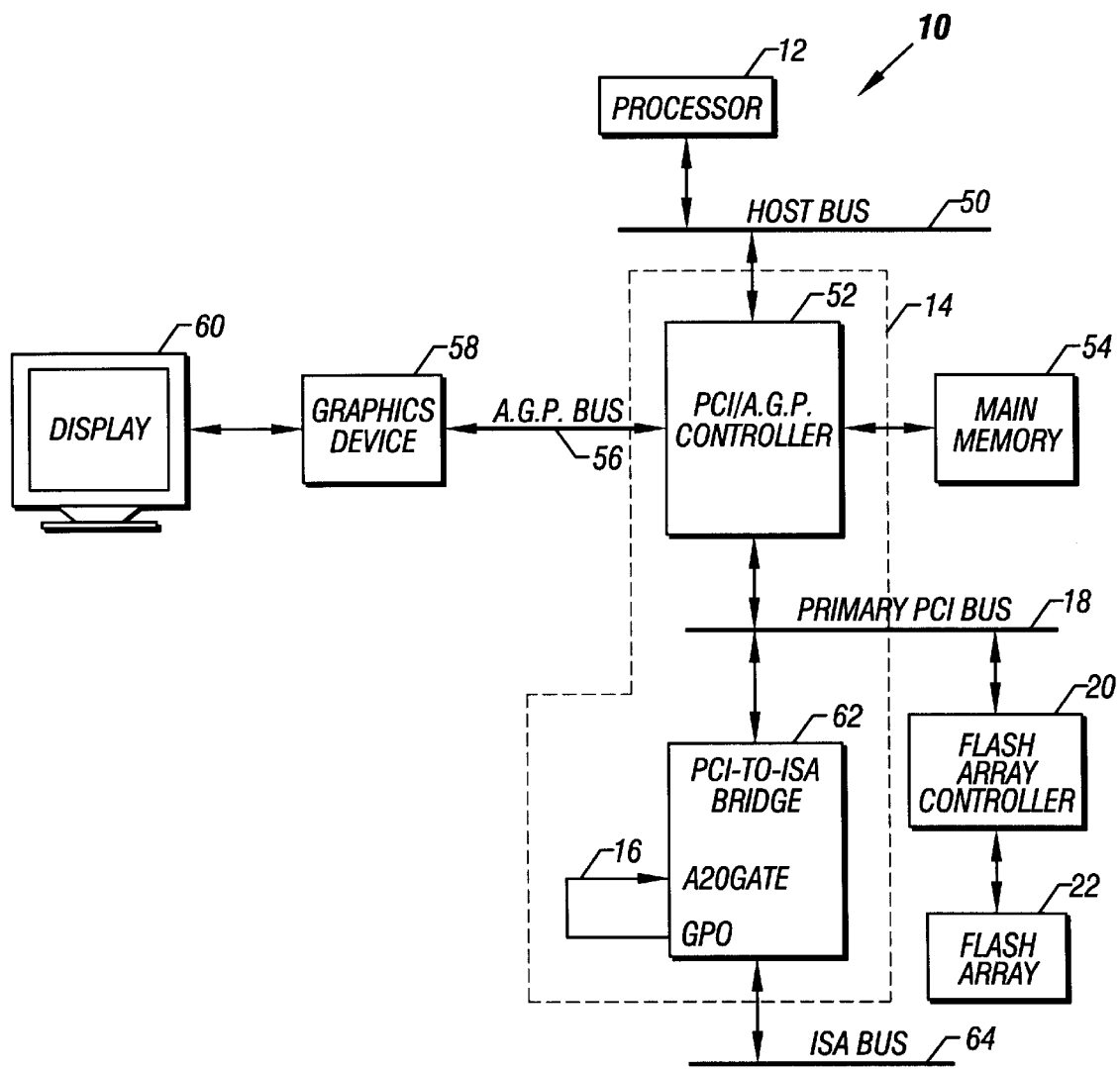
FIG. 1 is a schematic depiction of a processor-based system in accordance with one embodiment of the present invention.

Referring to FIG. 1, a processor-based system 10 includes a processor 12 coupled to a chipset 14. In one embodiment of the present invention, the chipset 14 may be a host bus-to-PCI bridge chipset. Thus, the processor 12 is coupled by a host bus 50 to the chipset 14 which in turn is coupled to a Peripheral Component Interconnect (PCI) bus 18. See the PCI Local Bus Specification, Revision 2.1 (Jun. 1, 1995) available from PCI Special Interest Group, Portland, Oreg. 97214. The PCI bus 18 may include a plurality of peripheral devices including a FLASH array controller 20. A FLASH array 22 may be coupled to the FLASH array controller 20.

While a PCI bus is referred to in the illustrated embodiment, the present invention is applicable to any bus which is not configured until after the system boot. By system boot, it is intended to refer to booting the entire system including the operating system software. Normally, this process is handled by the system Basic Input/Output System Read Only Memory (BIOS ROM). Booting instructions for individual devices (non-system boot) may be stored in an expansion ROM.

In accordance with conventional host-to-PCI bridge design, the chipset 14 automatically responds to a boot address by passing the boot address through the chipset to a legacy bus where the BIOS is conventionally stored. Generally, it is believed the system BIOS cannot be stored on the PCI bus. The problem arises because the PCI device is unable to recognize its address at power on or reset. Moreover, the PCI bus is configured by software which can not be run until after system boot up.

Thus, in the case of a system of the type depicted in FIG. 1 using a FLASH array 22, a first FLASH array 22 could be utilized to store information on the PCI bus. However, a second programmable read only memory (BIOS ROM) would be needed on a legacy or ISA bus to store the BIOS information since conventionally the PCI bus cards or add-in devices are not accessible until after the boot-up sequence is completed.

However, by controlling a chipset pin that selects the state of a specific address line, the desired signals can be provided on the PCI bus. The A20GATE pin is responsible in Intel architecture chipsets for masking address line 20. The signals on the A20GATE pin may cause the processor to wrap the address at the one megabyte boundary of the memory. Other architectures may utilize pins which are named differently.

By coupling the A20GATE input signals to a General Purpose Output (GPO) pin using a jumper 16, the appropriate signal levels may be provided to the A20GATE input pin at the desired times. More particularly, the A20GATE input pin may be set low at boot, causing the boot address to be different from what a legacy or ISA bus controller expects. Then, the A20GATE input pin may be asserted high after the system boot is complete with a GPO output signal. This causes the altered address to go out on the PCI bus so a PCI bus device may respond as the boot device.

Thus, the A20GATE pin may be used to provide the appropriate signals onto the PCI bus during the boot sequence. The boot address may be changed by masking an address line so that a boot device on the PCI bus is addressed. That is, one bit in the boot address may be altered so that the chipset 14 does not recognize the address and lets the address go onto the PCI bus. Otherwise, the boot device's address would automatically go out to the legacy bus.

Figure 2:
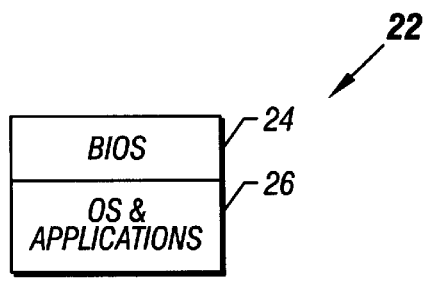
FIG. 2 is a depiction of the memory architecture of the FLASH array shown in FIG. 1.
Figure 3:
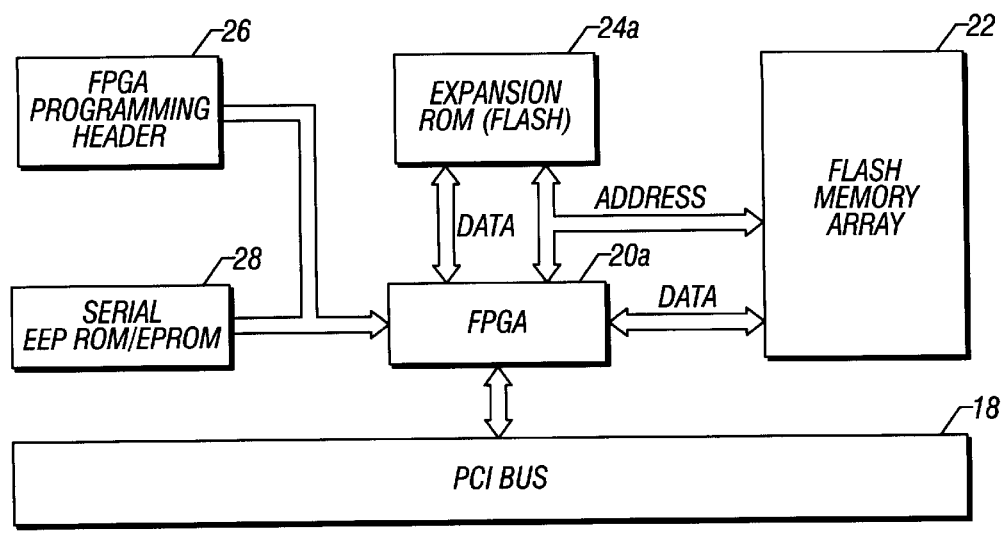
FIG. 3 is a schematic depiction of one embodiment of the FLASH array and array controller shown in FIG. 1.

The boot address information can be passed to the FLASH array 22 which may store the system BIOS instructions. Referring to FIG. 2, the memory architecture of the FLASH array 22 may include a first set of blocks storing the BIOS information 24 and a second set of blocks 26 defined within the FLASH array 22 to store other information such as an operating system and application software.

Current chipsets may capture the boot address before a PCI device can respond. PCI devices available to control the FLASH array are not able to respond to the boot address until after they are configured. By defeating the automatic boot response of the chipset, a modified PCI FLASH array controller 20 may respond to the boot address.

The FLASH array controller 20 may be configured to respond to the altered address as the boot device at power on or reset. PCI devices are generally passive until configured by software unless they are the boot device. Since the chipset normally responds to the boot address, commercial PCI devices that respond to the boot address at reset are not currently available. Thus, an existing device may be modified to allow it to be configured by its external serial ROM to respond to the boot address. Alternatively, a controller may be designed that specifically provides the ability to respond to the boot address at reset.

A variety of information may be provided in the blocks of the FLASH array 22. For example, an operating system may be stored in the portion 26 in embodiments not using a hard disk drive. Thus, the operating system may be shadowed from the FLASH array portion 26 into volatile memory. During boot up, the BIOS information may be shadowed from the BIOS blocks 24 into the system memory.

As shown in FIG. 2, re-programmable, nonvolatile semiconductor memory such as a FLASH memory 22 may be supplied on a PCI add-in card. The following description is intended to illustrate one application of the present invention and is not intended to be limiting in any way. The card may include a Xilinx XZ4000 family field programmable gate array (FPGA) 20a with a PCI bus 18 interface. The interface that generates appropriate address, data and control signals and sends them to the FLASH array 22.

A programming header 26 is available for the FPGA programming alteration. The program may be written to the FPGA via a serial port. A serial ROM 28 may store the FPGA program for configuration and power up. Once the ROM is downloaded to the FPGA, the card is ready to function.

The FLASH memory card supports the expansion ROM 24a function as well. This function facilitates dead start loads from the card at power up. The physical ROM may be an Intel two megabit boot block flash memory in one embodiment. This memory is set up in a x16 mode to speed up data transfers.

Figure 4:
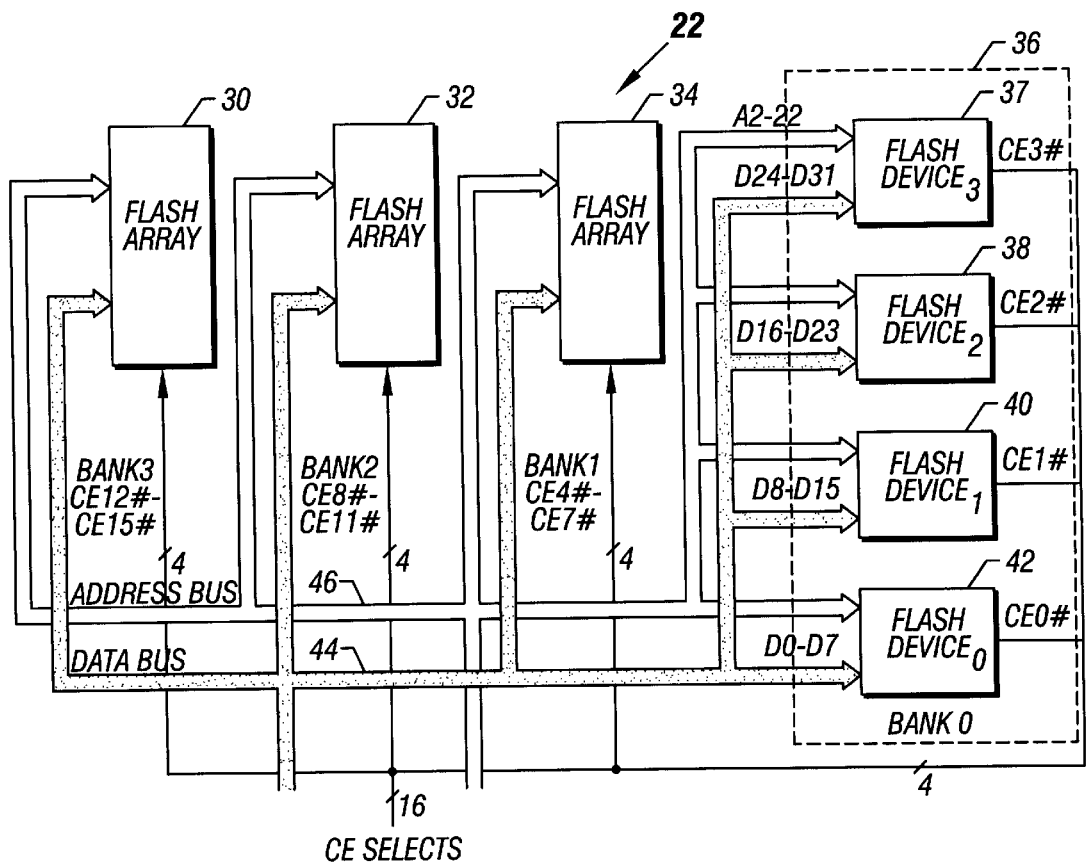
FIG. 4 is a more detailed block diagram of one embodiment of the FLASH memory array shown in FIGS. 1 and 3.

The FLASH memory array, shown in FIG. 4, may be divided into four banks 30, 32, 34 and 36, each with four devices 37, 38, 40 and 42 coupled to address and data buses 46 and 44 respectively. This banked array may be supported by four memory density modes within the FPGA: two megabyte, eight megabyte, sixteen megabyte and thirty-two megabyte.

The arrangement of the FLASH devices represents a double word aligned memory array. This means that for a given four byte read/write starting on a double word boundary (address x00H) within bank 36, the four bytes reside in the FLASH devices selected by CE0# through CE3# respectively. This may be an important system configuration when defining software utilities and when programming and erasing the FLASH.

Intel's high density FlashFile™ memory brand may be used for the memory array-in one embodiment of the present invention. These symmetrically-blocked FlashFile architecture devices may allow selective blocking.

The card may be operated using standard software routines that write and read FLASH devices. The standard software may need to be modified to account for the fact that the FPGA does not contain algorithms that automatically perform the multiple operations necessary to program and erase the FLASH devices. Table 1 describes the commands used to read, write and erase the FLASH and the commands used to determine FLASH status.

TABLE I

| Command | Bus Cycles Required | First Bus Cycle | | | Second Bus Cycle | | |
| --- | --- | --- | --- | --- | --- | --- | --- |
| | | Oper | Addr | Data | Oper | Addr | Data |
| Read Array/Reset | 1 | Write | X | FFH | | | |
| Read Identifier Codes | ≧2 | Write | X | 90H | Read | IA | ID |
| Read Status Register | 2 | Write | X | 70H | Read | X | SRD |
| Clear Status Register | 1 | Write | X | 50H | | | |
| Block Erase | 2 | Write | BA | 20H | Write | | D0H |
| Program | 2 | Write | PA | 40H or 10H | Write | BA | PD |
| Block Erase and Program Suspend | 1 | Write | X | B0H | | PA | |
| Block Erase and Program Resume | 1 | Write | X | D0H | | | |
| Set Block Lock Bit | 2 | Write | BA | 60H | Write | BA | 01H |
| Set Master Lock Bit | 2 | Write | X | 60H | Write | X | F1H |
| Clear Block Lock Bit | 2 | Write | X | 60H | Write | X | D0H |

BA = Address within the block being erased or locked
ID = Data read from identifier codes
IA = Identifier Code Address
X = Any valid address
PA = Address of memory location to be programmed
SRD—Data read from status register
PD = Data to be programmed at location PA responds to all commands on the PCI bus. The remaining FPGA logic responds to commands from the PCI bus The PCI to FLASH read transactions are normally handled by the FPGA. DEVSEL# is asserted back to the bus master during the fourth PCI clock cycle. Wait state timing occurs during clock cycles five to nine. On cycle ten, the FLASH data is valid and TRDY# and STOP# are asserted. This forces a target disconnect because burst transfers are not supported in this embodiment. With this read timing, assuming four byte transfers, the embodiment supports up to twelve megabyte per second transfers. The host recognizes the PCI disconnects and keeps track of addressing during what normally would be a burst transfer.

PCI to FLASH write operations are similar to read operations but complete in five PCI clock cycles. The assertion of the STOP# signals that burst transactions are not supported.

Erasing the FLASH may be accomplished by sending appropriate commands to the FLASH array. This is no different than writing to the array except that the first write to the array indicates a command to erase. The second write command confirms the erase command and indicates a block address to be erased. Similarly, commands to the array to determine FLASH status are sent via writes and status is read through normal read operations.

The memory system may use four separately selectable FLASH memory devices (37, 38, 40 and 42) connected to a data bus 44. It is possible to write single bytes to the FLASH array and there are no restrictions on addressing. However, when writing words or double words, the double word boundaries are not be crossed in a single transaction.

For contiguous address read and writes, the bytes may be stored across separate FLASH devices. For instance, four byte writes to address x00H are written to FLASH devices 42 to 37 at addresses represented by the (x) decoded value. Therefore, from the system standpoint, the FLASH memory block is not 64 kilobytes as defined by each device but rather 256 kilobytes as defined by the bank of memory. Similarly, when it desired to lock the first "block" of 256 kilobytes, the command is available across all 32 bits of the write data to indicate to each FLASH device that a block lock is requested.

An Intel boot block FLASH memory device may be used as the PCI expansion ROM 24a in one embodiment of the present invention. This device may operate in x16 bit mode to speed boot load operations. The expansion ROM may be accessed at power up through the system BIOS. The ROM PCI cycle can provide four bytes in twelve PCI clock cycles for a maximum read performance of eleven megabytes per second.

During initialization, the system BIOS checks the expansion ROM header. The BIOS verifies that the header is correct using signatures and checksums. Depending on the capabilities of the BIOS and the data contained within the ROM header, the BIOS shadows the expansion ROM contents to shadow RAM and calls the initialization routine. The initialization routine is responsible for card specific initialization functions. Once initialization is complete, the ROM initialization code returns to the BIOS for completion of the system initialization.

Since the address lines on the FLASH side of the FPGA connect to as many as seventeen devices, additional devices may be used to accommodate the load. Each address line from the FPGA may go to two buffers and is distributed to memory. Address lines are routed through the address pins to minimize load reflections. Series resistors may be employed to reduce reflections in long lines connected to the memory arrays.

The FLASH memory PCI card may have two sets of jumpers to select the configuration in one embodiment of the present invention. A first jumper block selects a FLASH memory array size. This size may be selectable from 64 kilobytes to two gigabytes. The second jumper may be used to configure the expansion ROM size. By default (all jumpers open), the expansion ROM is set to 64 kilobytes. The jumpers or hardwire through holes may provide a cost effective configuration change mechanism.

The FPGA may be programmed by a bit stream from either the serial ROM or from a computer. The bit stream may be created by compiling the VHDL code and the LogiCORE net-list with the FPGA software tools available from Xilinx. Once the FPGA is programmed with the bit stream it acts as a bridge between the PCI bus and the FLASH memory by converting PCI bus transactions into FLASH memory control signals.

The FPGA supports master and slave modes. The mode is selectable through a third jumper. When the jumper block is open, the FPGA is in the slave mode. In the slave mode, the FPGA is programmed through the header connection on the board using a computer and the appropriate tools. When the jumper is installed, the FPGA is in the master mode and automatically downloads its configuration from the serial ROM. Many applications may not require a full file system implementation. In many cases, designers will not want to provide the storage space required for a file system. Typical embedded systems do not run a full size hardware protected operating system such as Windows® NT. It is advisable for the card to begin executing after system start. The expansion ROM 24a serves this function.

Standard FLASH implementations provide contiguous address space for each chip. In some embodiments, the array/program algorithms take into account the fact that continuous address bit spans multiple devices. One method involves taking advantage of the 32 bit data bus 44. When programming/erasing is initiated, the command code byte sent to the devices is replicated four times within a 32-bit command/data word. This invokes the program/erase operation on all four devices within that address line. When using this method, the programmer verifies that accesses are done on double word boundaries. Once the command code is written, double word accesses may be performed to retrieve status from all four devices.

Several applications are available for download for the plug-in card from Intel's worldwide website at http:\\www.intel.com including cochise.exe which is a DOS executable that provides plug and play identification of the device, FLASH part detection identification, erase, write/read testing, device erase capability, download of DOS file to FLASH, and upload of FLASH contents and storage in file. In addition, a DOS executable called cupload.exe is available that transfers a file from a system motherboard to the FLASH memory. The executable verifies that the card exists in the system using plug and play BIOS calls, gets the configuration information for the PCI device and the FLASH devices and then copies the file from the system to the FLASH memory.

Typical embedded applications do not require user interaction before they begin execution. The BIOS boot segment may provide a way for any device in the system to be identified as an initial program load (IPL) device. If the system BIOS supports the specification, the expansion ROM within the card can indicate that it is an available IPL device. The BIOS maintains a list of IPL devices and assigns a priority to the devices. The user can change the IPL order priority of the available devices. If the expansion ROM is used as IPL device, the IPL code is contained within the expansion ROM of the card. The system BIOS calls the boot strap entry vector to boot the operating system. The expansion ROM either copies the operating system to the system memory for execution or jumps directly to the entry point of the image contained in FLASH memory.

Additional details can be found in application note AP-758, "FLASH Memory PCI Add-in Card for Embedded Systems", September 1997, Order No. 273121-001 available from Intel Corporation, Santa Clara, Calif.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for implementing a processor-based system comprising:

storing system boot instructions on a programmable, non-volatile memory coupled to a bus which is configured after the boot sequence; and accessing instructions in the memory in the process of booting the processor-based system using a general purpose output pin on a chipset to supply signals to an A20GATE pin to access the memory during the process of booting the processor-based system.

2. The method of claim 1 wherein storing boot instructions includes storing said instructions on a memory coupled to the peripheral component interconnect bus.

3. The method of claim 1 further including storing an operating system on said non-volatile memory.

4. The method of claim 1 wherein storing system boot instructions includes storing the basic input/output system on said memory.

5. The method of claim 1 further including modifying the address of a boot device.

6. The method of claim 5 further including causing a legacy bus controller to ignore said address.

7. The method of claim 6 further including causing a controller associated with said memory to respond to said address.

8. A processor-based system comprising:

a processor;

a volatile memory coupled to said processor;

a peripheral component interconnect bus coupled to said processor; and a non-volatile memory coupled to said bus storing system boot instructions; and a chipset coupled to said bus and having a general purpose output pin and an A20GATE pin, the general purpose output pin coupled to said A20GATE pin.

9. The system of claim 8 wherein said system boot instructions include the basic input/output system for said processor-based system.

10. The system of claim 9 wherein said non-volatile memory is a FLASH memory.

11. The system of claim 10 wherein said A20GATE pin is adapted to create a unique boot address for said non-volatile memory.

12. A method for implementing a processor-based system comprising:

storing system boot instructions on a programmable, non-volatile memory coupled to a bus which is configured after the boot sequence;

modifying the address of the boot device, and accessing instructions in the memory in the process of booting the processor-based system.

13. The method of claim 12 wherein storing boot instructions includes storing said instructions on a memory coupled to the peripheral component interconnect bus.

14. The method of claim 12 further including storing an operating system on said non-volatile memory.

15. The method of claim 12 wherein accessing instructions includes using a general purpose output pin on a chipset to supply signals to an A20GATE pin to access the memory during the process of booting the processor-based system.

16. The method of claim 12 wherein storing system boot instructions includes storing the basic input/output system on said memory.

17. The method of claim 12 further including causing a legacy bus controller to ignore said address.

18. The method of claim 17 further including causing a controller associated with said memory to respond to said address.

* * * * *